United States Patent [19]

Gordon et al.

[11] 4,022,662
[45] May 10, 1977

[54] NUCLEAR FUEL ELEMENT HAVING A METAL LINER AND A DIFFUSION BARRIER

[75] Inventors: Gerald M. Gordon, Fremont; Robert L. Cowan, II, Livermore, both of Calif.

[73] Assignee: General Electric Company, San Jose, Calif.

[22] Filed: Nov. 11, 1974

[21] Appl. No.: 522,771

[52] U.S. Cl. .................................. 176/82; 176/68
[51] Int. Cl.² .......................................... G21C 3/20
[58] Field of Search ........... 176/68, 82, 91 R, 91 S; 29/194, 196.2, 196.6, 198

[56] References Cited

UNITED STATES PATENTS

| | | | |
|---|---|---|---|
| 2,928,168 | 3/1960 | Gray | 176/91 R |
| 3,088,893 | 5/1963 | Spalaris | 176/73 |
| 3,184,373 | 5/1965 | Blomeyer et al. | 176/91 R |
| 3,291,700 | 12/1966 | Brossa et al. | 176/82 |
| 3,427,222 | 2/1969 | Biancheria et al. | 176/91 R |
| 3,466,226 | 9/1969 | Lass | 176/68 |
| 3,850,584 | 11/1974 | Bohm et al. | 29/194 |

Primary Examiner—Stephen C. Bentley
Assistant Examiner—S. A. Cangialosi
Attorney, Agent, or Firm—Ivor J. James, Jr.; Sam E. Laub; Samuel E. Turner

[57] ABSTRACT

An improved nuclear fuel element is disclosed for use in the core of nuclear reactors. The improved nuclear fuel element has a metal liner and a diffusion barrier disposed between the cladding and the nuclear fuel material. The diffusion barrier is in the form of a metal coating with the diffusion barrier being coated on the internal surface of the cladding in one embodiment and the diffusion barrier being coated on the outside surface of the metal liner in another embodiment. The diffusion barrier is a coating of chromium or a chromium alloy and serves to prevent any alloying or formation of low melting eutectic liquid phases between the metal liner and the cladding at elevated temperatures. The metal liner is selected from the group consisting of stainless steel, copper, copper alloys, nickel, and nickel alloys.

26 Claims, 3 Drawing Figures

NUCLEAR FUEL ELEMENT HAVING A METAL LINER AND A DIFFUSION BARRIER

BACKGROUND OF THE INVENTION

This invention relates broadly to an improvement in nuclear fuel elements for use in the core of nuclear fission reactors, and more particularly to an improved nuclear fuel element having a composite cladding container having a substrate and a metal layer on the inside surface of the substrate.

Nuclear reactors are presently being designed, constructed and operated in which the nuclear fuel is contained in fuel elements which can have various geometric shapes, such as plates, tubes, or rods. The fuel material is usually enclosed in a corrosion-resistant, non-reactive, heat conductive container or cladding. The elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reaction. The core in turn is enclosed within a reactor vessel through which a coolant is passed.

The cladding serves several purposes and two primary purposes are: first, to prevent contact and chemical reactions between the nuclear fuel and the coolant or the moderator if a moderator is present, or both if both the coolant and the moderator are present; and second, to prevent the radioactive fission products, some of which are gases, from being released from the fuel into the coolant or the moderator or both if both the coolant and the moderator are present. Common cladding materials are stainless steel, aluminum and its alloys, zirconium and its alloys, niobium (columbium), certain magnesium alloys, and others. The failure of the cladding, i.e., a loss of the leak tightness, can contaminate the coolant or moderator and the associated systems with radioactive long-lived products to a degree which interfers with plant operation.

Problems have been encountered in the manufacture and in the operation of nuclear fuel elements which employ certain metals and alloys as the cald material due to mechanical or chemical reactions of these cladding materials under certain circumstances. Zirconium and its alloys, under normal circumstances, are excellent nuclear fuel claddings since they have low neutron absorption cross sections and at temperatures below about 750° F (about 398° C) are strong, ductile, extremely stable and non-reactive in the presence of demineralized water or steam which are commonly used as reactor coolants and moderators.

However, fuel element performance has revealed a problem with the brittle splitting of the cladding due to the combined interactions between the nuclear fuel, the cladding and the fission products produced during nuclear fission reactions. It has been discovered that this undesirable performance is promoted by localized mechanical stresses due to fuel cladding differential expansion (stresses in the cladding are localized at cracks in the nuclear fuel). Corrosive fission products are released from the nuclear fuel and are present at the intersection of the fuel cracks with the cladding surface. Fission products are created in the nuclear fuel during the fission chain reaction during operation of a nuclear reactor. The localized stress is exaggerated by high friction between the fuel and the cladding.

Within the confines of a sealed fuel element, hydrogen gas can be generated by the slow reaction between the cladding, and the residual water inside the cladding may build up to levels which under certain conditions can result in localized hydriding of the cladding with concurrent local deterioration in the mechanical properties of the cladding. The cladding is also adversely affected by such gases as oxygen, nitrogen, carbon monoxide and carbon dioxide over a wide range of temperatures.

The zirconium cladding of a nuclear fuel element is exposed to one or more of the gases listed above and fission products during irradiation in a nuclear reactor and this occurs in spite of the fact that these gases and fission product elements may not be present in the reactor coolant or moderator, and further may have been excluded as far as possible from the ambient atmosphere during manufacture of the cladding and the fuel element. Sintered refractory and ceramic compositions, such as uranium dioxide and other compositions used as nuclear fuel, release measurable quantities of the aforementioned gases and fission products upon heating, such as during fuel element manufacture and further release fission products during irradiation. Particulate refractory and ceramic compositions, such as uranium dioxide powder and other powders used as nuclear fuel, have been known to release even larger quantities of the aforementioned gases during irradiation. These released gases are capable of reacting with the zirconium cladding containing the nuclear fuel.

Thus in light of the foregoing, it has been found desirable to minimize attack of the cladding from water, water vapor and other gases, especially hydrogen, reactive with the cladding from inside the fuel element throughout the time the fuel element is used in the operation of nuclear power plants. One such approach has been to find materials which will chemically react rapidly with the water, water vapor and other gases to eliminate these from the interior of the cladding, and such materials are called getters.

Another approach has been to coat the nuclear fuel material with a ceramic to prevent moisture coming in contact with the nuclear fuel material as disclosed in U.S. Pat. No. 3,108,936. U.S. Pat. No. 3,085,059 presents a fuel element including a metal casing containing one or more pellets of fissionable ceramic material and a layer of vitreous material bonded to the ceramic pellets so that the layer is between the casing and the nuclear fuel to assure uniformly good heat conduction from the pellets to the casing. U.S. Pat. No. 2,873,238 presents jacketed fissionable slugs of uranium canned in a metal case in which the protective jackets or coverings for the slugs are a zinc-aluminum bonding layer. U.S. Pat. No. 2,849,387 discloses a jacketed fissionable body comprising a plurality of open-ended jacketed body sections of nuclear fuel which have been dipped into a molten bath of a bonding material giving an effective thermally conductive bond between the uranium body sections and the container (or cladding). The coating is disclosed as any metal alloy having good thermal conduction properties with examples including aluminum-silicon and zinc-aluminum alloys. Japanese Patent Publication No. SHO 47–46559 dated Nov. 24, 1972, discloses consolidating discrete nuclear fuel particles into a carbon-containing matrix fuel composite by coating the fuel particles with a high density, smooth carbon-containing coating around the pellets. Still another coating disclosure is Japanese Patent Publication No. SHO 47-14200 in which the coating of one of two groups of pellets is with a layer of silicon carbide and the other group is coated with a layer of pyrocarbon or metal carbide.

The coating of a nuclear fuel material introduces reliability problems in that achieving uniform coatings free of faults is difficult. Further, the deterioration of the coating can introduce problems with the long-lived performance of the nuclear fuel material.

U.S. patent application Ser. No. 330,152 filed Feb. 6, 1973 discloses a method for preventing corrosion of nuclear fuel cladding consisting of the addition of a metal such as niobium to the fuel. The additive can be in the form of a powder, provided the subsequent fuel processing operation does not oxidize the metal, or incorporated into the fuel element as wires, sheets or other forms in, around, or between fuel pellets.

Document GEAP-4555 dated Feb. 1964 discloses a composite cladding of a zirconium alloy with an inner lining of stainless steel metallurgically bonded to the zirconium alloy, and the composite cladding is fabricated by use of extrusion of a hollow billet of the zirconium alloy having an inner lining of stainless steel. This cladding has the disadvantage that the stainless steel develops brittle phases, and the stainless steel layer involves a neutron absorption penalty of about ten to fifteen times the penalty for a zirconium alloy layer of the same thickness.

U.S. Pat. No. 3,502,549 discloses a method of protecting zirconium and its alloys by the electrolytic deposition of chrome to provide a composite material useful for nuclear reactors. A method for electrolytic deposition of copper on Zircaloy - 2 surfaces and subsequent heat treatment for the purpose of obtaining surface diffusion of the electrolytically deposited metal is presented in *Energia Nucleare* Volume 11, number 9 (Sept. 1964) at pages 505–508. In *Stability and Compatibility of Hydrogen Barriers Applied to Zirconium Alloys* by F. Brossa et al. (European Atomic Energy Community, Joint Nuclear Research Center, EUR 4098e 1969), methods of deposition of different coatings and their efficiency as hydrogen diffusion barriers are described along with an Al—Si coating as the most promising barrier against hydrogen diffusion. Methods for electroplating nickel on zirconium and zirconium tin alloys and heat treating these alloys to produce alloy-diffusion bonds are disclosed in *Electroplating on Zirconium and Zirconium-Tin* by W. C. Schickner et al. (BMI-757, Technical Information Service, 1952). U.S. Pat. No. 3,625,821 presents a fuel element for a nuclear reactor having a fuel cladding tube with the inner surface of the tube being coated with a retaining metal of low neutron capture cross section such as nickel and having finely dispersed particles of a burnable poison disposed therein. *Reactor Development Program Progress Report* of Aug., 1973 (ANL-RDP-19) discloses a chemical getter arrangement of a sacrificial layer of chromium on the inner surface of a stainless steel cladding.

Another approach has been to introduce a barrier between the nuclear fuel material and the cladding holding the nuclear fuel material as disclosed in U.S. Pat. No. 3,230,150 (copper foil), German Patent Publication DAS No. 1,238,115 (titanium layer), U.S. Pat. No. 3,212,988 (sheath of zirconium, aluminum or beryllium), U.S. Pat. No. 3,018,238 (barrier of crystalline carbon between the $UO_2$ and the zirconium cladding), and U.S. Pat. No. 3,088,893 (stainless steel foil). While the barrier concept proves promising, some of the foregoing references involve incompatible materials with either the nuclear fuel (e.g., carbon can combine with oxygen from the nuclear fuel), or the cladding, (e.g., copper and other metals can react with the cladding, altering the properties of the cladding), or the nuclear fission reaction (e.g., by acting as neutron absorbers). None of the listed references disclose solutions to the recently discovered problem of localized chemical-mechanical interactions between the nuclear fuel and the cladding.

Further approaches to the barrier concept are disclosed in U.S. Pat. No. 3,969,186, issued July 13, 1976 (refractory metal such as molybdenum, tungsten, rhenium, niobium and alloys thereof in the form of a tube or foil of single or multiple layers or a coating on the internal surface of the cladding), and U.S. Pat. No. 3,925,151, filed Feb. 11, 1974 (liner of zirconium, niobium or alloys thereof between the nuclear fuel and the claddings with a coating of a high lubricity material between the liner and the cladding).

Accordingly, it has remained desirable to develop nuclear fuel elements minimizing the problems discussed above.

SUMMARY OF THE INVENTION

A particularly effective nuclear fuel element for use in the core of a nuclear reactor has (1) a metal liner and (2) a diffusion barrier disposed between the cladding and the nuclear fuel material. The diffusion barrier is in the form of a coating with the diffusion barrier being coated on the internal surface of the cladding in one embodiment and the diffusion barrier being coated on the outside surface of the metal liner in another embodiment. The liner is comprised of a low neutron capture cross-section material and is preferably comprised of a material selected from the group consisting of stainless steel, copper, copper alloys, nickel, or nickel alloys. The liner serves as a shield for the cladding and as a preferential reaction site for reaction with volatile impurities or fission products present inside the nuclear fuel element and in this manner serves to protect the cladding from exposure to and attack by the volatile impurities or fission products. During nuclear fission reactions in a nuclear reactor, the liner has a higher ambient temperature than does the cladding. The diffusion barrier is comprised of chromium or a chromium alloy and the diffusion barrier can be in the form of a coating or can be bonded to the substrate. The diffusion barrier prevents any possible reaction at elevated temperatures between the cladding and the metal liner. The reaction of concern is the formation of a low melting (<2200° F) liquid eutectic phase between the zirconium alloy fuel cladding and the metal liner which can occur during a postulated loss of coolant accident if the diffusion barrier is not present. The coating of the diffusion barrier can be accomplished by several processes including (a) electroplating, (b) electroplating followed by heating to achieve diffusion of the electroplated coating into the electroplated substrate and (c) vapor deposition.

OBJECTS OF THE INVENTION

It is an object of this invention to provide a nuclear fuel element capable of operating in nuclear reactors for extended periods of time without the occurrence of splitting of the cladding, corrosion of the cladding, or other failure problems.

It is another object of this invention to provide a nuclear fuel element having a low neutron capture cross section metal liner disposed between the cladding and the nuclear fuel material serving as a reaction site for reaction with volatile impurities or fission products inside the nuclear fuel element.

Still another object of this invention is to provide a nuclear fuel element having a diffusion barrier disposed between the metal liner and the cladding serving to prevent reaction at elevated temperatures such as occurs during a postulated loss of coolant accident between the cladding and the metal liner.

The foregoing and other objects of this invention will become apparent to a person skilled in the art from reading the following specification and the appended claims with reference to the accompanying drawings described immediately hereinafter.

DESCRIPTION OF THE INVENTION

Figure 1:
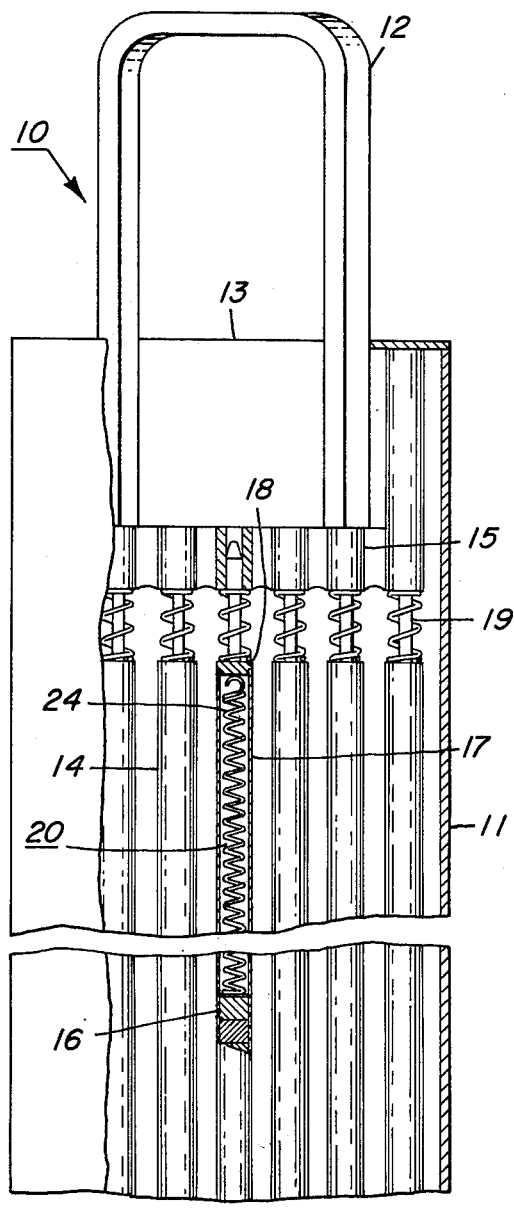
FIG. 1 presents a partial cutaway sectional view of a nuclear fuel assembly containing nuclear fuel elements constructed according to the teaching of this invention.

Referring now more particularly to FIG. 1, there is shown a partically cutaway sectional view of a nuclear fuel assembly 10. This fuel assembly consists of a tubular flow channel 11 of generally square cross section provided at its upper end with lifting bale 12 and at its lower end with a nose piece (not shown due to the lower portion of assembly 10 being omitted). The upper end of channel 11 is open at 13 and the lower end of the nose piece is provided with coolant flow openings. An array of fuel elements or rods 14 is enclosed in channel 11 and supported therein by means of upper end plate 15 and a lower end plate (not shown due to the lower portion being omitted). The liquid coolant ordinarily enters through the openings in the lower end of the nose piece, passes upwardly around fuel elements 14, and discharges at upper outlet 13 in a partially vaporized condition for boiling reactors or in an unvaporized condition for pressurized reactors at an elevated temperature.

The nuclear fuel elements or rods 14 are sealed at their ends by means of end plugs 18 welded to the cladding 17, which may include studs 19 to facilitate the mounting of the fuel rod in the assembly. A void space or plenum 20 is provided at one end of the element to permit longitudinal expansion of the fuel material and accumulation of gases released from the fuel material. A nuclear fuel material retainer means 24 in the form of a helical member is positioned within space 20 to provide restraint against the axial movement of the pellet column, especially during handling and transportation of the fuel element.

The fuel element is designed to provide an excellent thermal contact between the cladding and the fuel material, a minimum of parasitic neutron absorption and resistance to bowing and vibration which is occasionally caused by flow of the coolant at high velocity.

A nuclear fuel element or rod 14 is shown in a partial section in FIG. 1 constructed in according to the teachings of this invention. The fuel element includes a core or central cylindrical portion of nuclear fuel material 16, here shown as a plurality of fuel pellets of fissionable and/or fertile material positioned within a structural cladding or container 17. In some cases the fuel pellets may be of various shapes such as cylindrical pellets or spheres, and in other cases different fuel forms such as a particulate fuel may be used. The physical form of the fuel is immaterial to this invention. Various nuclear fuel materials may be used including uranium compounds, plutonium compounds, thorium compounds, and mixtures thereof. A preferred fuel is uranium dioxide or a mixture comprising uranium dioxide and plutonium dioxide.

Figure 2:
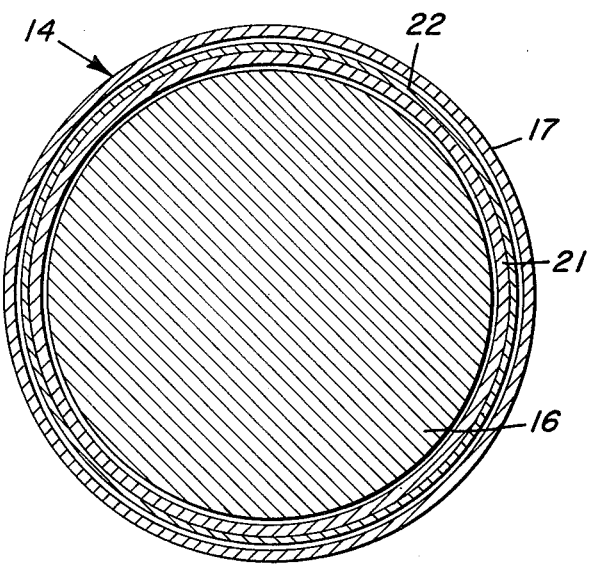
FIG. 2 presents an enlarged sectional view of one embodiment of the nuclear fuel element according to the teaching of this invention.

Referring now to FIG. 2, the nuclear fuel material 16 forming the central core of the fuel element 14 is surrounded by a low neutron absorption cross section metal liner (liner) 21. The liner 21 serves as a preferential sink or reaction site for reaction with volatile impurities or fission products inside the nuclear fuel element and in this manner serves as one of the layers protecting the cladding 17 from exposure to and attack by the volatile impurities or fission products inside the nuclear fuel element. During nuclear fission reactions in a nuclear reactor, the liner 21 has a higher ambient temperature than does the cladding, and the liner is preferably comprised of a material selected from the group consisting of stainless steel, copper, copper alloys and nickel and nickel alloys. The thickness of the liner is selected to be greater than the longest fission product recoil distance but less than the current gap in existing nuclear fuel elements between the cladding and the nuclear fuel material. The operating temperature of the nuclear fuel element is above the temperature at which any significant neutron radiation damage to the liner occurs, and the liner is ductile, has a high work-hardening coefficient and a high resistance to crack initiation and propagation.

The liner 21 is coated on its outer surface by a diffusion barrier 22 so that the diffusion barrier 22 is between the cladding 17 and the metal liner 21. The diffusion barrier 22 can be applied to the metal liner by various processes including electroplating, electroplating followed by a heating step to achieve diffusion of the electroplated coating into the metal liner chromizing and vapor deposition.

In addition, the liner 21 can be in the form of a hollow cylindrical foil or foil wrapped to form a hollow cylinder and is capable of being inserted inside the cladding. The diffusion barrier 22 can be selected from the group consisting of chromium and chromium alloys with a preferred diffusion barrier being chromium.

The cladding 17 is a metal container serving to prevent contact and chemical reactions between the nuclear fuel and the reactor coolant and/or moderator and to prevent the radioactive fission products occurring in the nuclear fuel during nuclear fission reactions from getting into the reactor coolant and/or moderator. Preferred cladding materials are zirconium and zirconium alloys with an especially peferred cladding being Zircaloy-2.

Figure 3:
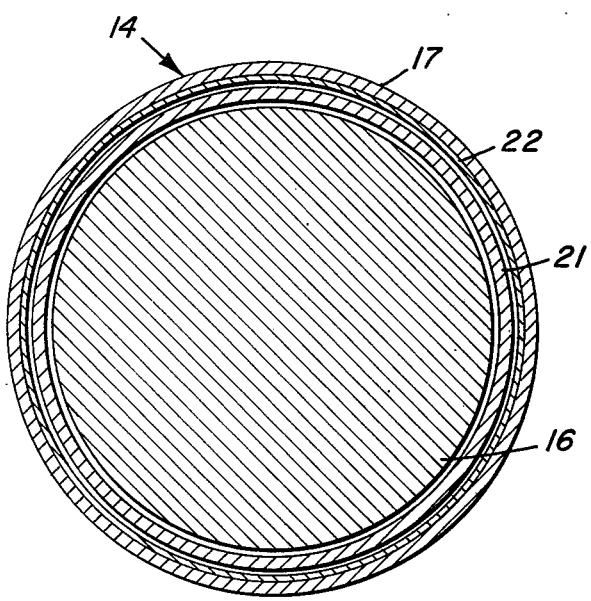
FIG. 3 presents an enlarged sectional view of another embodiment of the nuclear fuel element of this invention.

Referring now to FIG. 3, the nuclear fuel material 16 forming the central core of the nuclear fuel element 14 is surrounded by a low neutron absorption cross section metal liner (liner) 21. The liner performs the functions and is comprised as described above for FIG. 2. The cladding 17 has a diffusion barrier 22 on the inside surface of the cladding 17. This diffusion barrier is applied to the cladding surface by various processes including electroplating, electroplating followed by a heating step to achieve diffusion of the electroplating coating and the cladding, or by vapor deposition. The function of the cladding 17 and diffusion barrier 22 are as described above for FIG. 2.

The present invention offers several advantages promoting a long operating life for the nuclear fuel element including the reduction of cladding hydriding, the minimization of localized stress, the minimization of stress and strain corrosion, and the reduction of the probability of a splitting failure in the cladding. The invention further prevents expansion (or swelling) of the nuclear fuel into direct contact with the cladding, and this prevents localized stress on the cladding, initiation or acceleration of stress corrosion of the cladding and bonding of the nuclear fuel to the cladding.

Another striking advantage of this invention is the absence of direct contact between the cladding and either the nuclear fuel material or the metal liner thus avoiding the possibility of a reaction between either the cladding and the nuclear fuel material or between the cladding and the metal liner.

The properties of the liner can be independently selected, and this leaves the design of the properties of the cladding to be independent of any functions other than containment and thermal conductivity functions. In particular the composition and texture of the liner can be selected to maximize the effectiveness of the liner in protecting the cladding from fission products and gaseous impurities in the nuclear fuel element. Also the liner composition and texture can be easily selected (independently of the cladding) to assure that the liner is ductile. The liner can also be selected to have a high work hardening coefficient and a high resistance to crack initiation and propagation than possible for the cladding.

As will be apparent to those skilled in the art, various modifications and changes may be made in the invention described herein. It is accordingly the intention that the invention be construed in the broadest manner within the spirit and scope as set forth in the accompanying claims.

What is claimed is:

1. A nuclear fuel element comprising (a) a central core of a body of nuclear fuel material selected from uranium compounds, plutonium compounds, thorium compounds and mixtures thereof, (b) a separate unattached metal liner of a constant thickness greater than the longest fission product recoil distance and comprised of a material selected from the group consisting of stainless steel, copper, copper alloys, nickel and nickel alloys surrounding the central core of nuclear fuel material, (c) an elongated clad container selected from the group consisting of zirconium and zirconium alloys surrounding the metal liner so as to leave a gap between the liner and the container and (d) a diffusion barrier selected from the group consisting of chromium and chromium alloys being coated on the inside surface of the clad container, said fuel element being assembled so the clad container, the core, and the metal liner are not in direct contact during use in a nuclear reactor.

2. A nuclear fuel element of claim 1 which has in addition a plenum portion and a nuclear fuel element retaining means in the form of a helical member in the plenum portion of the fuel element.

3. A nuclear fuel element of claim 1 in which the metal liner is comprised of stainless steel.

4. A nuclear fuel element of claim 1 in which the metal liner is comprised of copper.

5. A nuclear fuel element of claim 1 in which the metal liner is comprised of a copper alloy.

6. A nuclear fuel element of claim 1 in which the metal liner is comprised of nickel.

7. A nuclear fuel element of claim 1 in which the metal liner is comprised of a nickel alloy.

8. A nuclear fuel element of claim 1 in which the clad container is comprised of zirconium alloy.

9. A nuclear fuel element of claim 1 in which the diffusion barrier is chromium.

10. A nuclear fuel element of claim 1 in which the diffusion barrier is a chromium alloy.

11. A nuclear fuel element of claim 1 in which the nuclear fuel material consists of uranium compounds.

12. A nuclear fuel element of claim 1 in which the nuclear fuel material is comprised of uranium dioxide.

13. A nuclear fuel element of claim 1 in which the nuclear fuel material is a mixture comprising uranium dioxide and plutonium dioxide.

14. A nuclear fuel element comprising (a) a central core of a body of nuclear fuel material selected from uranium compounds, plutonium compounds, thorium compounds and mixtures thereof, (b) a separate unattached metal liner of a constant thickness greater than the longest fission product recoil distance and comprised of a material selected from the group consisting of stainless steel, copper, copper alloys, nickel and nickel alloys surrounding the central core of nuclear fuel material, (c) a diffusion barrier selected from the group consisting of chromium and chromium alloys being coated on the outside surface of the metal liner and (d) an elongated clad container selected from the group consisting of zirconium and zirconium alloys surrounding the metal liner and leaving a gap between the liner and the container, said fuel element being assembled so the clad container, the core, and the metal liner are not in direct contact during use in a nuclear reactor.

15. A nuclear fuel element of claim 14 which has in addition a plenum portion and a nuclear fuel element retaining means in the form of a helical member in the plenum portion of the fuel element.

16. A nuclear fuel element of claim 14 in which the metal liner is comprised of stainless steel.

17. A nuclear fuel element of claim 14 in which the metal liner is comprised of copper.

18. A nuclear fuel element of claim 14 in which the metal liner is comprised of a copper alloy.

19. A nuclear fuel element of claim 14 in which the metal liner is comprised of nickel.

20. A nuclear fuel element of claim 14 in which the metal liner is comprised of a nickel alloy.

21. A nuclear fuel element of claim 14 in which the clad container is comprised of zirconium alloy.

22. A nuclear fuel element of claim 14 in which the diffusion barrier is chromium.

23. A nuclear fuel element of claim 14 in which the diffusion barrier is a chromium alloy.

24. A nuclear fuel element of claim 14 in which the nuclear fuel material consists of uranium compounds.

25. A nuclear fuel element of claim 14 in which the nuclear fuel material is comprised of uranium dioxide.

26. A nuclear fuel element of claim 14 in which the nuclear fuel material is a mixture comprising uranium dioxide and plutonium dioxide.

* * * * *